(12) United States Patent
Kato et al.

(10) Patent No.: US 6,870,663 B2
(45) Date of Patent: Mar. 22, 2005

(54) WAVELENGTH TUNABLE LIGHT SOURCE AND PULSE LIGHT SOURCE

(75) Inventors: Masao Kato, Atsugi (JP); Kazuo Fujiura, Mito (JP); Takashi Kurihara, Atsugi (JP); Kenji Kurokawa, Tsukuba (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 227 days.

(21) Appl. No.: 10/228,357

(22) Filed: Aug. 27, 2002

(65) Prior Publication Data
US 2003/0043451 A1 Mar. 6, 2003

(30) Foreign Application Priority Data

Aug. 28, 2001 (JP) ........................................ 2001-258646
Sep. 28, 2001 (JP) ........................................ 2001-303741

(51) Int. Cl.⁷ ............................... G02F 2/02; H01S 3/13
(52) U.S. Cl. ......................................... 359/326; 372/20
(58) Field of Search ................................ 359/326–332; 372/20

(56) References Cited

U.S. PATENT DOCUMENTS 5,671,241 A * 9/1997 Stamm et al. ................ 372/20

FOREIGN PATENT DOCUMENTS

| JP | 8-146474 A | 6/1996 |
|----|------------|--------|
| JP | 2000-105394 A | 4/2000 |
| JP | 2000-258809 A | 9/2000 |

* cited by examiner

Primary Examiner—John D. Lee
(74) Attorney, Agent, or Firm—Venable LLP; Catherine M. Voorhees

(57) ABSTRACT

A wavelength tunable light source includes an optical pulse generating section for generating an optical pulse; an amplitude control section for controlling the amplitude of the optical pulse generated by the optical pulse generating section by superimposing control light on the optical pulse to output a short optical pulse; and an optical frequency converting section for converting the frequency of the short optical pulse by launching the short optical pulse output from the amplitude control section into an optical nonlinear medium whose refractive index varies in response to the electric-field intensity of the incident light. The amplitude control section can be configured such that it carries out the time division multiplexing and outputs the short optical pulse, thereby constituting an optical pulse light source.

21 Claims, 14 Drawing Sheets

US 6,870,663 B2

WAVELENGTH TUNABLE LIGHT SOURCE AND PULSE LIGHT SOURCE

This application is based on Japanese Patent Application No. 2001-258646 filed Aug. 28, 2001 and No. 2001-303741 filed Sep. 28, 2001, the content of which is incorporated hereinto by reference.

BACKGROUND OF THE INVENTION

1. Field of the Invention

The present invention relates to a wavelength tunable light source and a pulse light source, and more particularly to a wavelength tunable light source capable of selectively generating light with different wavelength and a pulse light source capable of generating multiple-wavelength pulse trains simultaneously. The wavelength tunable light source and pulse light source are used as a light source of an optical path routing system called an optical routing system, an optical signal processing system, and a wavelength multiplexing transmission system, as well as a light source of a spectroscope for investigating physical properties.

2. Description of the Related Art

There are a number of reports about the wavelength tunable light source capable of varying the operational wavelength artificially.

For example, Japanese Patent Application Laid-open No. 8-146474 (1996) discloses a device capable of generating a short, high intensity optical pulse at low noise. The device is configured such that it generates a short optical pulse by a light source, amplifies by an optical amplifier the optical intensity of the optical pulse to an optical intensity level beyond the level capable of generating an optical soliton, and inputs the amplified optical pulse to an optical fiber with an anomalous dispersion characteristic to form an optical soliton, and that it shifts the optical soliton from the wavelengths of the optical noise involved in the amplification by the self-frequency shift effect of the optical soliton, and blocks the wavelength components of the optical noise in the output light from the optical fiber by an optical filter, thereby generating a short, high intensity, low noise optical pulse.

Japanese Patent Application Laid-open No. 2000-105394 discloses a compact wavelength tunable short optical pulse generator capable of tuning the wavelength without adjusting its optical system, and generating an ideal femtosecond soliton pulse. The device comprises a short pulse light source, an optical characteristic regulator for regulating the characteristics of the light supplied from the short pulse light source, and an optical fiber that receives an input pulse from the optical characteristic regulator and linearly varies the wavelength of the output pulse. With such a configuration, it can launch the short optical pulse into the optical fiber, generate a soliton pulse utilizing the nonlinear effect in the optical fiber, and shift the wavelength of the soliton pulse linearly with respect to the incident optical intensity by the nonlinear effect.

Furthermore, Japanese Patent Application Laid-open No. 2000-258809 discloses a multiple wavelength light pulse generating system capable of generating ultra-short optical pulse trains with a plurality of wavelengths simultaneously using a wavelength tunable pulse light source as its light source. This system comprises an optical demultiplexer for demultiplexing a short optical pulse output from a femtosecond fiber laser into a plurality of pulses, and a plurality of optical fibers for guiding the optical pulses output from the optical demultiplexer.

Although these types of the wavelength tunable light sources are inadequate in their stability and operability, there are various types of wavelength tunable light sources that can cover a wide wavelength range from the vacuum ultraviolet to extremely high frequency region. For example, as wavelength tunable light sources used in the optical communications in the near infrared and the more extended infrared region, there are optical parametric oscillators and Raman lasers utilizing optical nonlinear effect. Besides these light sources, dye lasers, solid state lasers and semiconductor lasers (called LD (Laser Diode) from now on) are available as the wavelength tunable light sources.

The optical parametric oscillator is configured such that a nonlinear optical crystal capable of generating frequency components different from the frequency of the pumping light is inserted into an optical cavity composed of a plurality of reflecting mirrors, and oscillates by pumping it with suitable pumping light. Selecting the optical nonlinear crystal and pumping light appropriately enables it to vary the wavelength in a wide range from 200 nm to 1,600 nm band, and even up to 5,000 nm to 70,000 nm.

The Raman laser is a light source that utilizes the amplification phenomenon of the Raman scattering light by irradiating a material with strong pumping light, and generates coherent light with a frequency of the Stokes ray or anti-Stokes ray. In particular, the Raman laser utilizing high-order Raman shift has a wide range wavelength tunable characteristic. It is reported that selecting appropriate nonlinear medium and pumping light enables it to vary the wavelength from the 500 nm band to 50,000 nm band.

The short optical pulse dye laser is a light source that achieves fluorescence by exciting liquid that dissolves an organic dye by a solvent. It is known that selecting the type of the dye and the wavelength of the pumping light makes it possible to tune the wavelength in the wavelength band from 300 to 900 nm.

As the solid state laser, a titanium sapphire laser is known which has a gain band region in a 680 to 1,100 nm range by absorbing light of 400 to 600 nm. The titanium sapphire laser utilizing a nonlinear optical crystal such as BBO ($\beta$-$BaB_2O_4$) or LBO ($LiB_3O_5$) has a tunable range of 300 to 1,100 nm band. It is reported that the BBO can vary the wavelength in a wide band from 1,100 to 10,000 nm by inputting 1,100 nm high output light.

The LD can achieve the wavelength tunable characteristic over 1,200–1,600 nm band by combining it with an external cavity and by carrying out chip selection and temperature control appropriately. It has an output characteristic above a few milliwatt output, and is characterized by wavelength stability, compact body size and high operability. Accordingly, it is utilized by wide spectrum of users from a research field to a practical field.

It is essential for the communications light source to be compact and stable. Accordingly, the dye laser, optical parametric oscillator and solid state laser are difficult to be applied to the communication light source. This is because the dye laser is unstable in the oscillation because of the liquid laser medium, and the other two lasers are composed of spatial optical system vulnerable to vibration and dust. Consequently, the light sources other than the LD are not actually used in communications at present.

In addition, the communication wavelength tunable light source must meet the following conditions: a short line width (spectral width) and sufficient output power above a few milliwatts; a tunable width capable of covering the bandwidth of optical amplifiers such as EDFAs (Erbium Doped Fiber Amplifiers) from several hundred to several thousand gigahertz band; and stable operation at desired frequencies. As for the desired frequencies, the ITU-T recommendation defines that the reference (anchor) frequency is 193.1 THz (1,552.524 nm), and the frequency spacing (frequency grid) is 100 GHz (about 0.8 nm) or 50 GHz. Accordingly, the wavelength tunable light source must operate at the wavelength of 1,552.524 nm±0.8 M or 1,552.524 nm±0.4 M, where M is an integer. The frequency stabilization on the order of 1/10 of the channel spacing, that is, the accuracy of about 10 GHz (about 0.08 nm) or 5 GHz (about 0.04 nm) is required.

The external cavity LD, which provides an output with a short line width and above a few milliwatts, has the performance suitable for practical use as the light source of the communication. The external cavity LD, however, must perform mechanical cavity control for achieving wavelength tunability. Accordingly, it has a slow tunable rate of about milliseconds to be used as the wavelength tunable light source, thereby offering a problem of having non-oscillation frequencies (mode hopping). In addition, the tunable wavelength bandwidth is limited to several tens to one hundred nanometers for a single LD chip. Thus, the wavelength tunable light source using the external cavity LD has problems in the tunable rate, operation stability and tunable bandwidth.

As for the Raman laser that has a wide wavelength tunable bandwidth, its tunable frequency is determined by the material characteristics of the nonlinear medium controlling the amplification of the Raman scattering light. Using a silica optical fiber as the nonlinear medium gives a large Raman frequency shift amount of about 100 nm. Accordingly, the tunable frequency is limited, and the operation at a desired frequency is difficult. In addition, since the threshold of producing the stimulated Raman scattering is usually high, a problem arises in that the pumping light requires high output power laser.

SUMMARY OF THE INVENTION

The present invention is implemented to solve the foregoing problems. The first object of the present invention is to provide a wavelength tunable light source with an ultra-fast wavelength tunable rate on the order of a few picoseconds by controlling optical Kerr effect, a wavelength tunable mechanism, by optical control using control light.

The second object of the present invention is to provide a compact wavelength tunable light source highly suitable for practical use requiring no expert knowledge by applying LD pumping to an optical waveguide such as a fiber and by using optical soliton with stable operation among optical nonlinear phenomena, thereby improving its stability and operability.

The third object of the present invention is to provide a wavelength tunable light source with a wide wavelength tunable bandwidth that extends over several hundred nanometers and is not limited by the gain bandwidth of the LD by using the wavelength tunable mechanism based on the optical Kerr effect.

The fourth object of the present invention is to provide a pulse light source having an ultra-fast wavelength tunable rate and wide wavelength tunable bandwidth, and capable of generating a given number of pulses with a given wavelength at a given repetition frequency, and simultaneously generating pulse trains at different repetition frequencies.

According to a first aspect of the present invention, there is provided a wavelength tunable light source comprising: an optical pulse generating section; an amplitude control section for controlling the amplitude of the optical pulse generated by the optical pulse generating section by superimposing control light on the optical pulse to output a short optical pulse; and an optical frequency converting section for converting a frequency of the short optical pulse by launching the short optical pulse output from the amplitude control section into an optical nonlinear medium whose refractive index varies in response to electric-field intensity of the incident light.

Here, the optical pulse generating section may comprise a pulse compression section for compressing a pulse width of the optical pulse.

The amplitude control section may comprise a control light generating section for generating the control light; a control light modulating section for modulating at least one of the amplitude and phase of the control light generated by the control light generating section; and a multiplexing section for outputting the short optical pulse by multiplexing the control light modulated by the modulating section with the optical pulse.

The amplitude control section may comprise a demultiplexing section for demultiplexing the optical pulse into first and second optical pulses; a control light modulating section for modulating one of amplitude and phase of the first optical pulse; and a multiplexing section for multiplexing the second optical pulse with the first optical pulse modulated by the control light modulating section to output the short optical pulse.

According to a second aspect of the present invention, there is provided a wavelength tunable light source comprising: an optical pulse generating section; an amplitude control section for time division multiplexing the optical pulses generated by the optical pulse generating section to output short optical pulses; and an optical frequency converting section for converting a frequency of the short optical pulses by launching the short optical pulses output from the amplitude control section into an optical nonlinear medium whose refractive index varies in response to electric-field intensity of the incident light.

Here, the amplitude control section may comprise a demultiplexing section for demultiplexing each of the optical pulses into a plurality of optical pulses; a delay section for providing a different time delay to each of the optical pulses demultiplexed by the demultiplexing section; and a multiplexing section for multiplexing the optical pulses output from the delay section. The demultiplexing section may be configured such that it carries out equal demultiplexing that provides the individual demultiplexed optical pulses with a same optical intensity level, or unequal demultiplexing that provides at least two of the demultiplexed optical pulses with different optical intensity levels.

The pulse light source may further comprise a pulse compression section for compressing a pulse width of the optical pulse generated by the optical pulse generating section, and for supplying the compressed optical pulse to the amplitude control section.

According to the present invention, it is possible to implement an ultra-fast wavelength tunable rate of about a few picoseconds and a wide wavelength tunable bandwidth of several hundred nanometers by utilizing the optical control using the control light and the wavelength tunable function based on the optical Kerr effect using the nonlinear medium.

In addition, according to the present invention, it is possible to improve the stability and operability by using the optical soliton with stable operation among the optical nonlinear phenomena.

Furthermore, according to the present invention, it is possible to provide the pulse light source capable of simultaneously generating pulse trains with different wavelengths and different repetition frequencies.

The eminently practical wavelength tunable light source and pulse light source enable a highly functional system such as an optical routing system, optical signal processing system and the like.

The above and other objects, effects, features and advantages of the present invention will become more apparent from the following description of embodiments thereof taken in conjunction with the accompanying drawings.

DETAILED DESCRIPTION OF PREFERRED EMBODIMENTS

Figure 1:
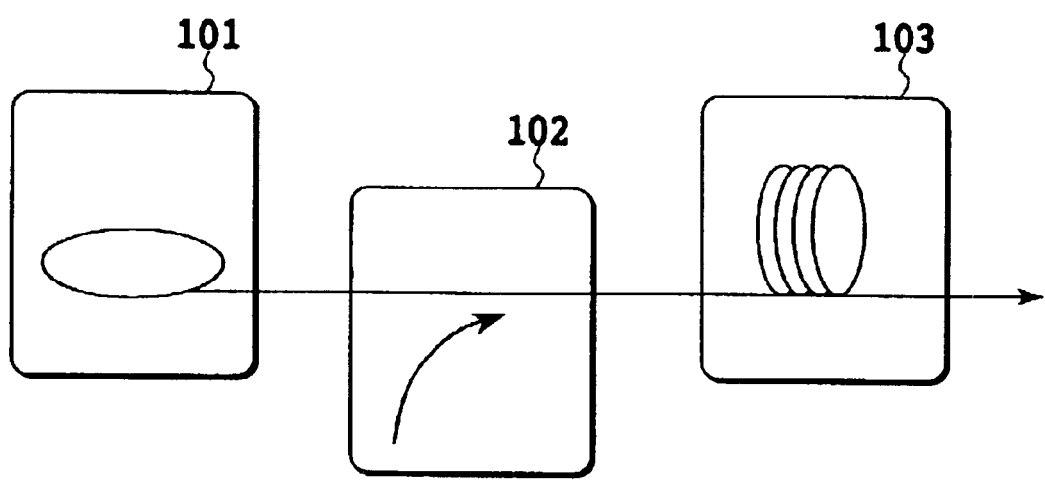
FIG. 1 is a block diagram showing a configuration of a wavelength tunable light source of a first embodiment in accordance with the present invention.

The invention will now be described with reference to the accompanying drawings, in which the same reference numerals designate the sections carrying out the same functions, and the duplicate description thereof will be omitted.

[Wavelength Tunable Light Source]

FIG. 1 shows a configuration of the wavelength tunable light source of the first embodiment in accordance with the present invention. The wavelength tunable light source comprises an optical pulse generating section 101; an amplitude control section 102 for controlling the amplitude of the optical pulse generated by the optical pulse generating section 101; and an optical frequency converter 103 for converting the frequency of the optical pulse output from the amplitude control section 102.

The optical pulse generating section 101 is a pulse light source excited by LD pumping, and generates a short optical pulse. The amplitude control section 102 controls the amplitude of the short optical pulse from the optical pulse generating section 101 by coherent interference using the control light.

A phenomenon is known in which when a short optical pulse propagates through a nonlinear medium such as an optical fiber, the optical frequency shifts toward the longer wavelength side in accordance with the propagation distance. The phenomenon is interpreted as is produced by the frequency shift caused by the intra-pulse Raman scattering called soliton self-frequency shift. In this case, the nonlinear medium has a zero dispersion wavelength at a wavelength shorter than the central wavelength of the optical pulse. The optical frequency converter 103 achieves ultra-fast, wide bandwidth wavelength tunable operation by controlling the optical Kerr effect in such a fiber.

Arranging the light source in accordance with the present invention using the optical waveguide such as the optical fiber instead of using a spatial optical system can implement the maintenance free, highly operable wavelength tunable light source that does not require trouble for adjusting optical axis or expert knowledge of a user. In addition, using the LD pumping can achieve the system with highly stable, compact and economical characteristics.

Figure 2:
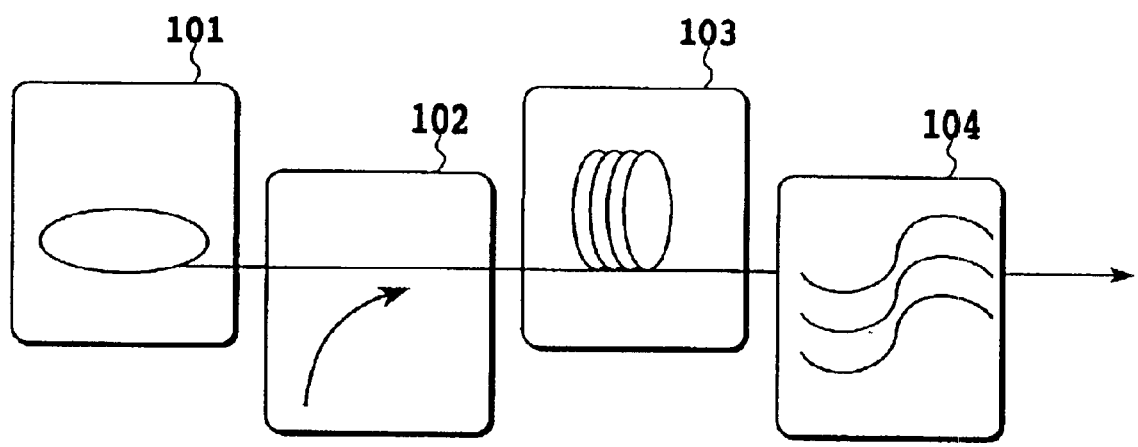
FIG. 2 is a block diagram showing a configuration of a wavelength tunable light source of a second embodiment in accordance with the present invention.

FIG. 2 shows a configuration of the wavelength tunable light source of the second embodiment in accordance with the present invention. The wavelength tunable light source comprises an optical frequency selecting section 104 composed of an optical frequency bandpass filter connected to the output side of the optical frequency converter 103 of the wavelength tunable light source in the first embodiment. The wavelength tunable light source of the first embodiment as shown in FIG. 1 constitutes a wavelength tunable pulse light source. In contrast, the wavelength tunable light source of the second embodiment as shown in FIG. 2 constitutes a wavelength tunable continuous light source when using a short bandwidth filter as the optical frequency selecting section 104.

Figures 3A, 3B:
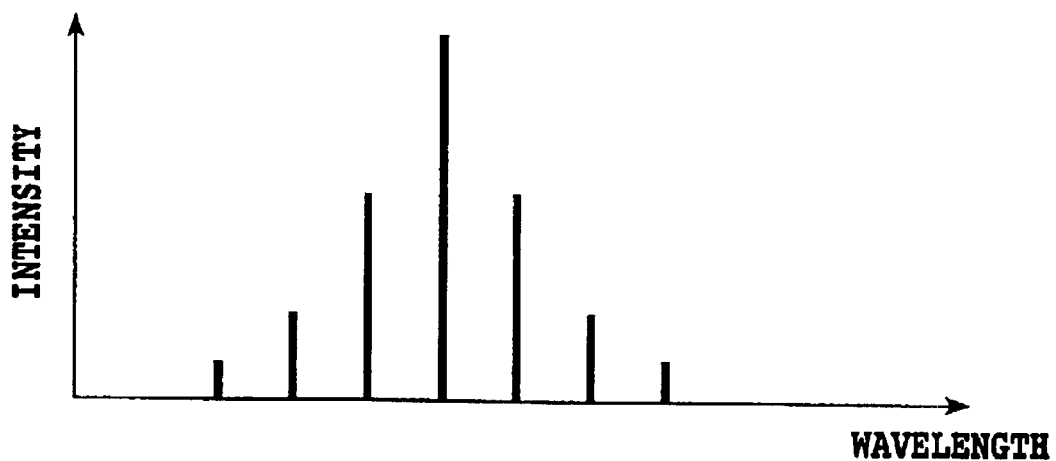
FIG. 3A is a graph illustrating an output spectrum of the wavelength tunable light source of the first embodiment.
FIG. 3B is a graph illustrating an output spectrum of the wavelength tunable light source of the second embodiment.

FIG. 3A illustrates an output spectrum of the wavelength tunable light source of the first embodiment. The wavelength tunable light source of the first embodiment includes the longitudinal mode component (side band) depending on the repetition frequency of the optical pulse generated by the optical pulse generating section 101. FIG. 3B illustrates the output spectrum of the wavelength tunable light source of the second embodiment. The wavelength tunable light source of the second embodiment can output only one frequency component through the short band optical filter 104.

Figure 4A:
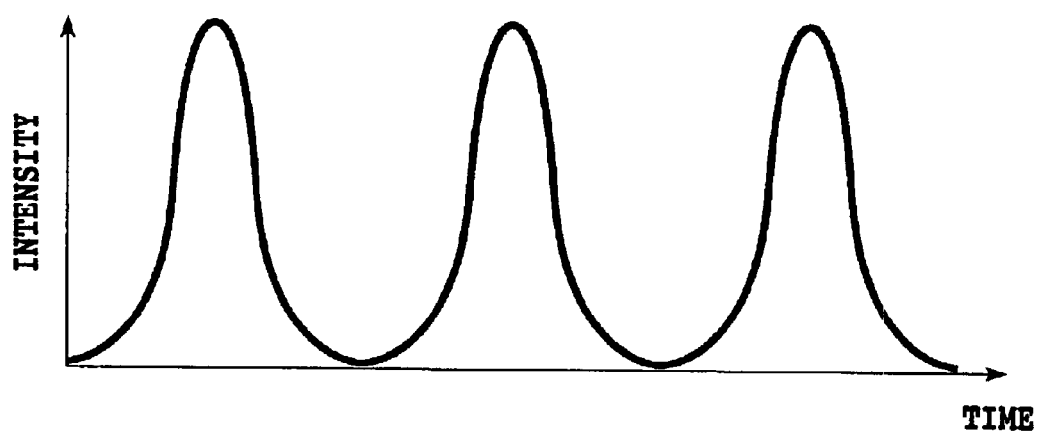
FIG. 4A is a graph illustrating an output time waveform of the wavelength tunable light source of the first embodiment.
Figure 4B:
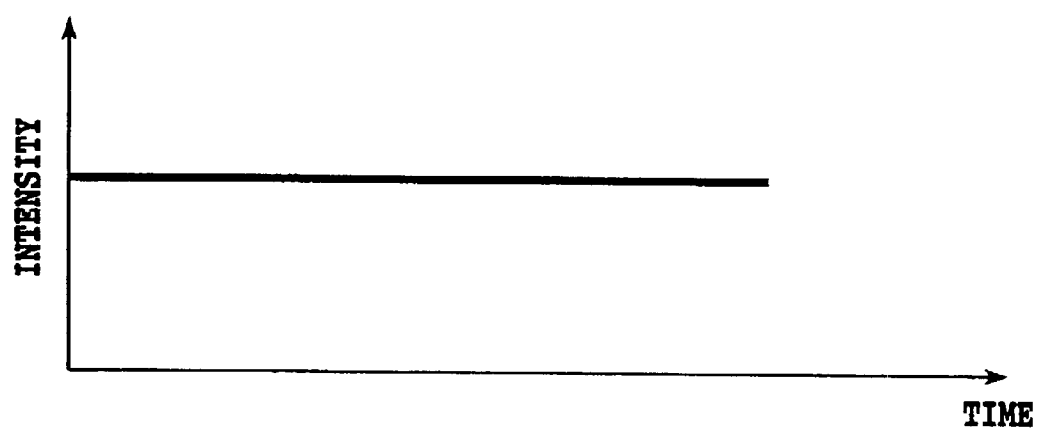
FIG. 4B is a graph illustrating an output time waveform of the wavelength tunable light source of the second embodiment.

FIG. 4A illustrates an output waveform of the wavelength tunable light source of the first embodiment. The wavelength tunable light source of the first embodiment outputs a pulse waveform depending on the waveform of the optical pulse generated by the optical pulse generating section 101. FIG. 4B illustrates an output waveform of the wavelength tunable light source of the second embodiment. The wavelength tunable light source of the second embodiment outputs continuous light when extracting only one frequency component from the spectrum components of the optical pulse.

Figure 5:
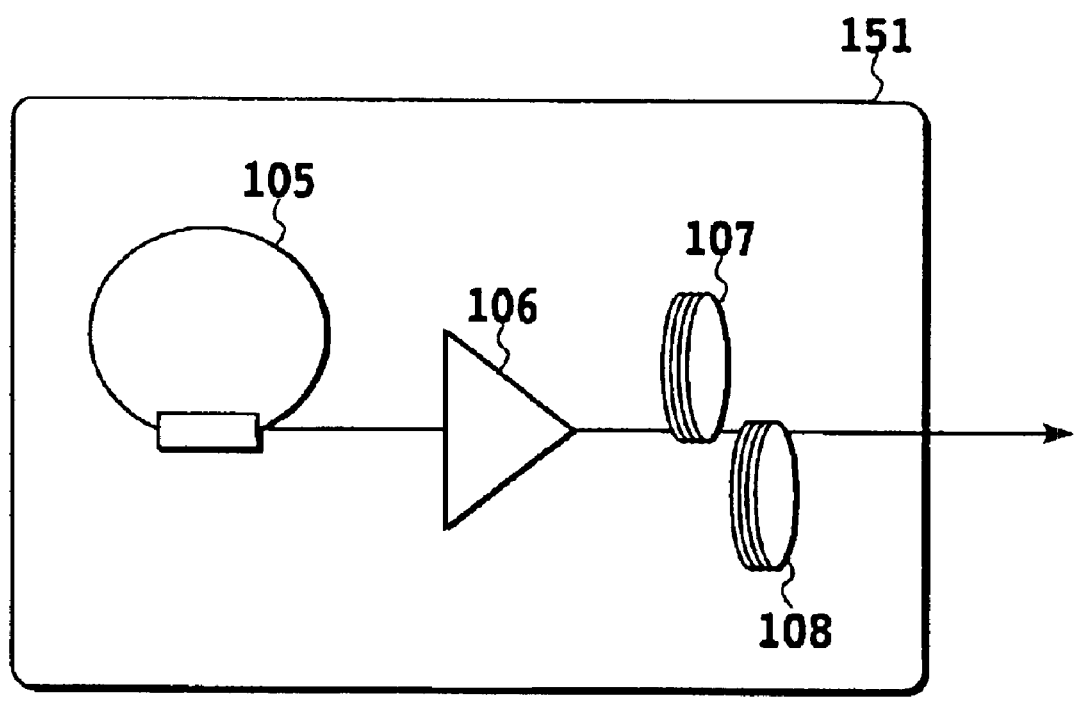
FIG. 5 is a block diagram showing a configuration of the optical pulse generating section of an embodiment in accordance with the present invention.

The optical frequency converter 103, which makes the wavelength conversion to a desired wavelength, can carry out the wavelength conversion more easily as the pulse width of the input pulse becomes shorter. Accordingly, it is preferable that the pulse width of the input pulse to the optical frequency converter 103 be as short as possible. FIG. 5 shows a configuration of the optical pulse generating section of an embodiment in accordance with the present invention. The optical pulse generating section 151 has a configuration that adds a pulse compression function to the inside of the optical pulse generating section 101 as shown in FIGS. 1 and 2. It is difficult for the optical pulse generating section 101 without the pulse compression function to bring about the wavelength conversion by a rather wide input pulse, unless it uses a high output optical amplifier.

The optical pulse generating section 151 as shown in FIG. 5 utilizes the optical nonlinear phenomenon as the pulse compression method. The optical pulse generated by an optical pulse generator 105 is amplified to a desired optical intensity level by an optical amplifier 106. The optical intensity can also be controlled using an optical attenuator. In this case, when the optical intensity of the optical pulse generated by the optical pulse generator 105 is strong enough to bring about the pulse compression in the optical nonlinear medium 107, the optical amplifier 106 can be removed. In the optical nonlinear medium 107, the frequency components of the spectrum expand because the refractive index varies in time in response to the optical intensity (intensity of electric field). Correcting the temporal deviation (chirping) of the frequency components by a dispersion medium 108 enables the pulse compression.

Using an optical fiber with an appropriate wavelength dispersion slope enables both the optical nonlinear medium 107 and dispersion medium 108 to achieve their functions simultaneously. To achieve the efficient pulse compression, it is effective to utilize a method of increasing the peak power of the pulse with the compression, or a phenomenon that the zero dispersion wavelength in the nonlinear medium for the pulse compression shifts toward the longer wavelength side with the propagation of the compressed pulse.

A principle of the pulse compression will be described briefly. The present embodiment carries out the pulse compression using the optical soliton effect. When a pulse with great optical intensity travels through the nonlinear medium, refractive index changes occur in the nonlinear medium in accordance with the optical intensity (intensity of electric field) of the optical pulse. The refractive index changes bring about temporal variations in the phase of the light, thereby generating new optical frequency components. Since the generated optical frequency components are chirping with the temporal changes as described above, it must be compensated for by a dispersion medium with opposite temporal characteristics. Thus, the new frequency components are added which are coherent with the frequency components of the original optical pulse. Accordingly, the temporal waveform is sharpened (compressed) on the time axis, the Fourier transform of the frequency components. The soliton number (N) and the pulse compression ratio (Fc) have a relationship of Fc=4.1×N. Accordingly, the pulse compression ratio increases with the soliton number, thereby providing a shorter optical pulse.

Here, the soliton effect will be described briefly. The soliton wave is based on a nonlinear wave phenomenon, and is known as a wave that propagates long distance without corruption thanks to the balance between the pulse sharpening by the nonlinear effect and the pulse spread due to the wavelength dispersion. More specifically, it is known that the relationship $P0 \times T0^2 = N^2 \times |B2|/\gamma$ holds, where $\gamma$ is a nonlinear constant indicating a nonlinear property of the nonlinear medium, T0 is the pulse width of the optical pulse, P0 is the peak power, B2 is a factor indicating the dispersion (D) of the nonlinear medium, and N is the soliton number. A nonlinear active length (Ln1) is given by $Ln1 = 0.322 \times \pi \times 1.76 \times T0^2/(2 \times |B2|)$. The nonlinear active length Ln1 is also called the soliton period. Incidentally, the pulse compression function of the optical pulse generating section 151 is not limited to the foregoing. For example, the pulse compression can be achieved using a saturable absorber that varies its transmittance by a high-speed optical switch and optical intensity.

Next, the optical frequency converter 103 will be described. The wavelength tunable light source of the present embodiment utilizes a phenomenon called the soliton self-frequency shift. It is a phenomenon that the pulse itself causes frequency shift, which is described physically by the Raman effect involving intra-pulse Raman scattering. Raman scattering results from the interaction between the light incident on the nonlinear medium and the optical phonon in the nonlinear medium. Without stimulated scattering, the amount of the scattering is very small, and is less than −60 dB as compared with the incident light.

However, it brings about the stimulated scattering above a particular threshold (Raman threshold) so that almost all the power of the incident light causes the Raman frequency shift, resulting in the wavelength conversion. As for an ultra-short optical pulse, the input pulse has a sufficiently wide spectral width. Accordingly, the components on the longer wavelength side can be effectively amplified by pumping with the short wavelength components obtained by the Raman gain. The process is present along the nonlinear medium, and continuously converts the energy of the short wavelength components to the longer wavelength components. The frequency shift is proportional to the fourth power of the pulse width T ($T^4$) of the input pulse. The phenomenon is very fast so that the response speed of the frequency shift is on the order of picosecond ($10^{-12}$ second) or less.

Figure 6:
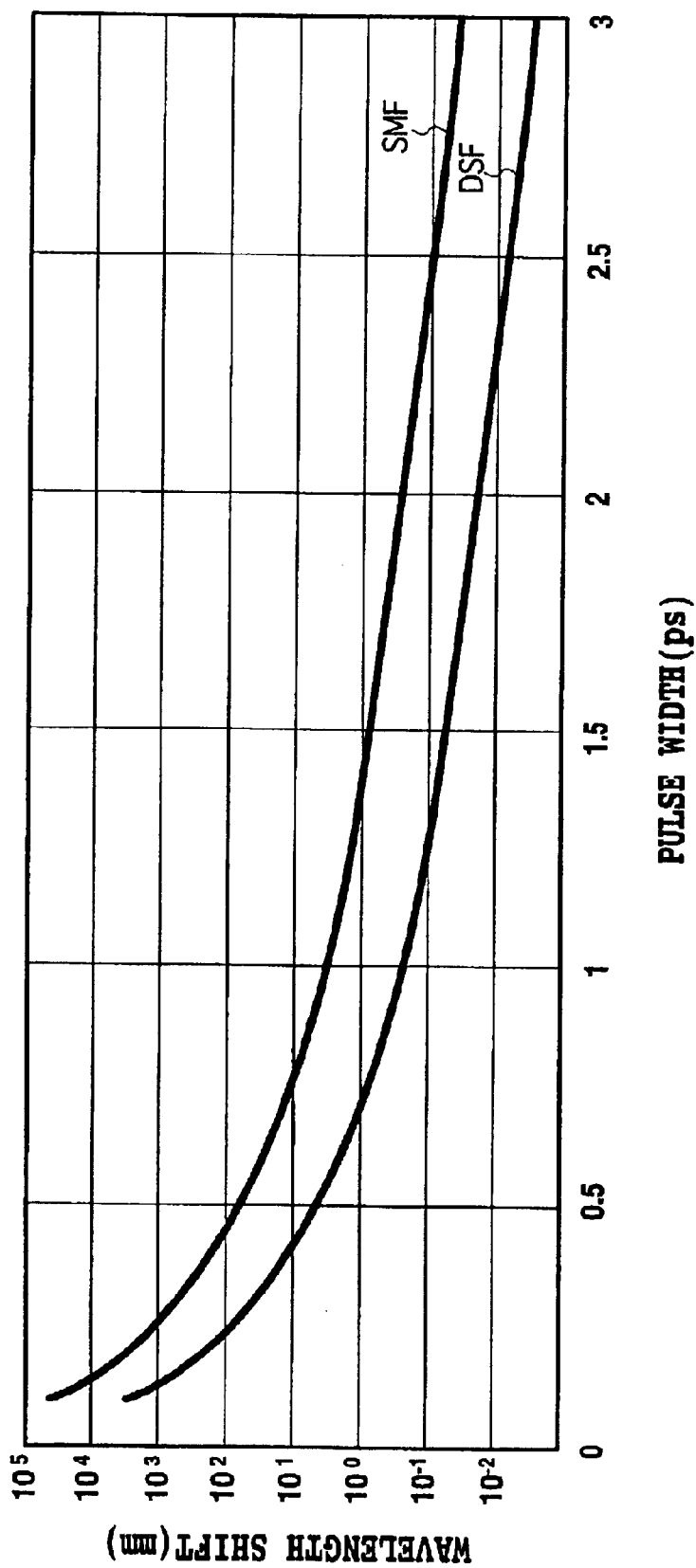
FIG. 6 is a graph illustrating relationships between the pulse width and wavelength shift amount of an optical pulse.

FIG. 6 illustrates relationships between the pulse width of the optical pulse and the wavelength shift amount. As the optical fiber, a 1-km single mode fiber (SMF) and dispersion shifted fiber (DSF) are used. It is seen from FIG. 6 that the optical pulse generating section 101 must generate an ultra-short optical pulse to achieve the required wavelength shift amount. In addition, the wavelength shift amount depends on the propagation distance and the intensity of the pulse. Accordingly, to apply the soliton self-frequency shift to the wavelength tunable light source, it is necessary to control the optical intensity or the propagation distance. Appropriate selection of the pulse width and propagation distance makes it possible to achieve ultra broad wavelength tunable bandwidth beyond several hundred nanometers.

More specifically, the relationship between the frequency variation $d\lambda$ (THz/km) and the width $\tau$ of the optical pulse is given by $d\lambda$ (THz/km)$=0.0436/\tau^4$.

Accordingly, when the fiber length is less than 20 km, a tunable frequency range of about 10 GHz is obtained for the optical pulse width of 3.1 ps, and a tunable frequency range of about 50 THz is achieved for the optical pulse width of 0.36 ps.

Figure 7:
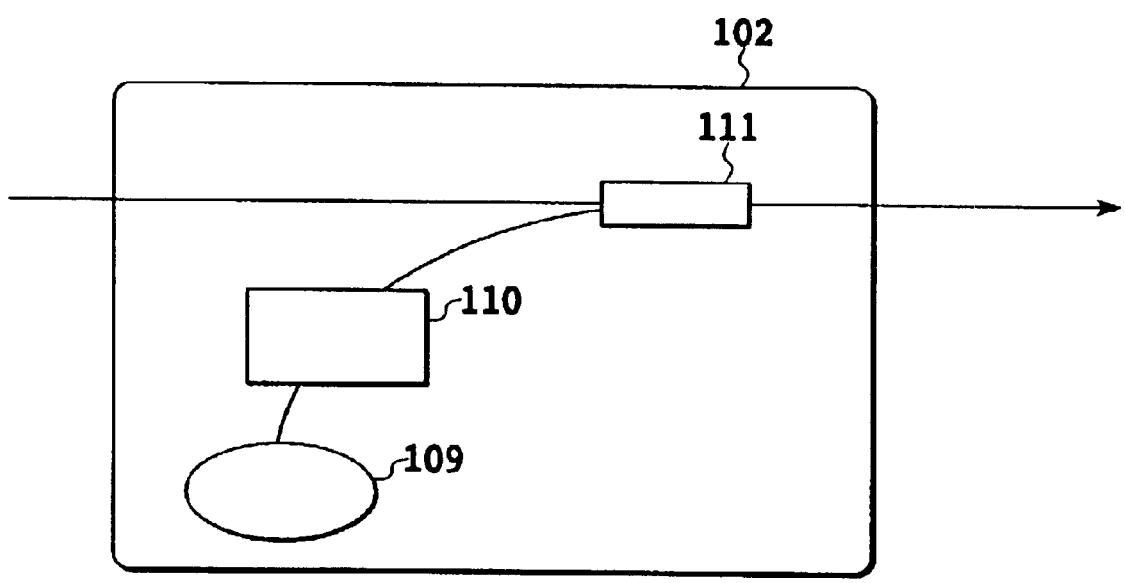
FIG. 7 is a block diagram showing a first example of the amplitude control section of an embodiment in accordance with the present invention.

FIG. 7 shows a first example of the amplitude control section of an embodiment in accordance with the present invention. The amplitude control section 102 controls the optical intensity incident to the optical frequency converter 103 to control the above-mentioned wavelength shift amount. The wavelength tunable light source of the present embodiment utilizes the optical interference effect to control the amplitude of the optical pulse. The amplitude control section 102 comprises a light source 109 for generating the control light; a modulator 110 for modulating the amplitude of the control light from the light source 109; and an optical coupler 111 for multiplexing the modulated control light with the main pulse. The amplitude of the main pulse multiplexed with the control light varies sharply, so that the optical frequency converter 103 can vary the wavelength greatly.

The amplitude of the main pulse can also be controlled by phase modulation. Since the phase modulation enables the control of very small amplitude, it can implement a fine wavelength tunable scheme. To achieve stable optical interference, the polarization plane of the main pulse must be matched to that of the control light. Accordingly, the configuration must include a polarization controller and a polarization-maintaining fiber.

Figure 8:
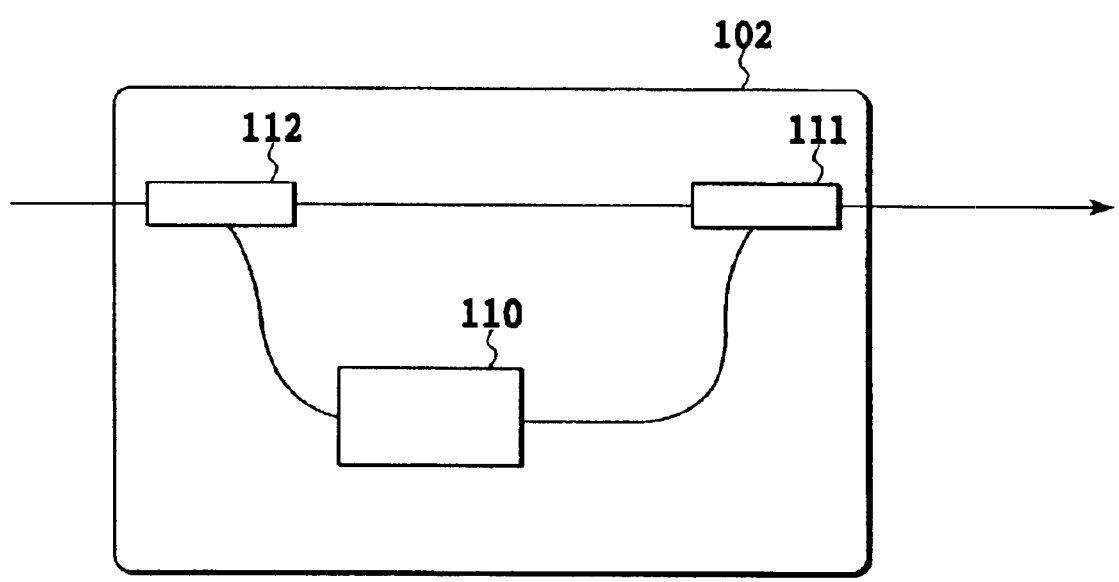
FIG. 8 is a block diagram showing a second example of the amplitude control section of an embodiment in accordance with the present invention.

FIG. 8 shows a second example of the amplitude control section of the embodiment in accordance with the present invention. The amplitude control section 102 uses the light it splits as the control light. An optical coupler 112 functioning as a demultiplexing means extracts the light from the main pulse, a modulator 110 functioning as a control light modulating means modulates the light, and an optical coupler 111 functioning as the multiplexing means multiplexes the light with the main pulse. The configuration can obviate the light source, and make it easier to synchronize the control light with the main pulse. In addition, adding an optical amplification function to the modulator 110 can increase the wavelength tunable width.

The optical frequency selecting section 104 in the wavelength tunable light source of the second embodiment will be described. The wavelength-tuned light includes a pulse-like longitudinal mode (side band) component that depends on the repetition frequency of the pulse generated by the optical pulse generating section 101. It is possible for an arrayed-waveguide grating, in which the longitudinal mode spacing is matched with the wavelength separation frequency spacing, to generate continuous light by extracting a single frequency component from the pulse.

Figure 9:
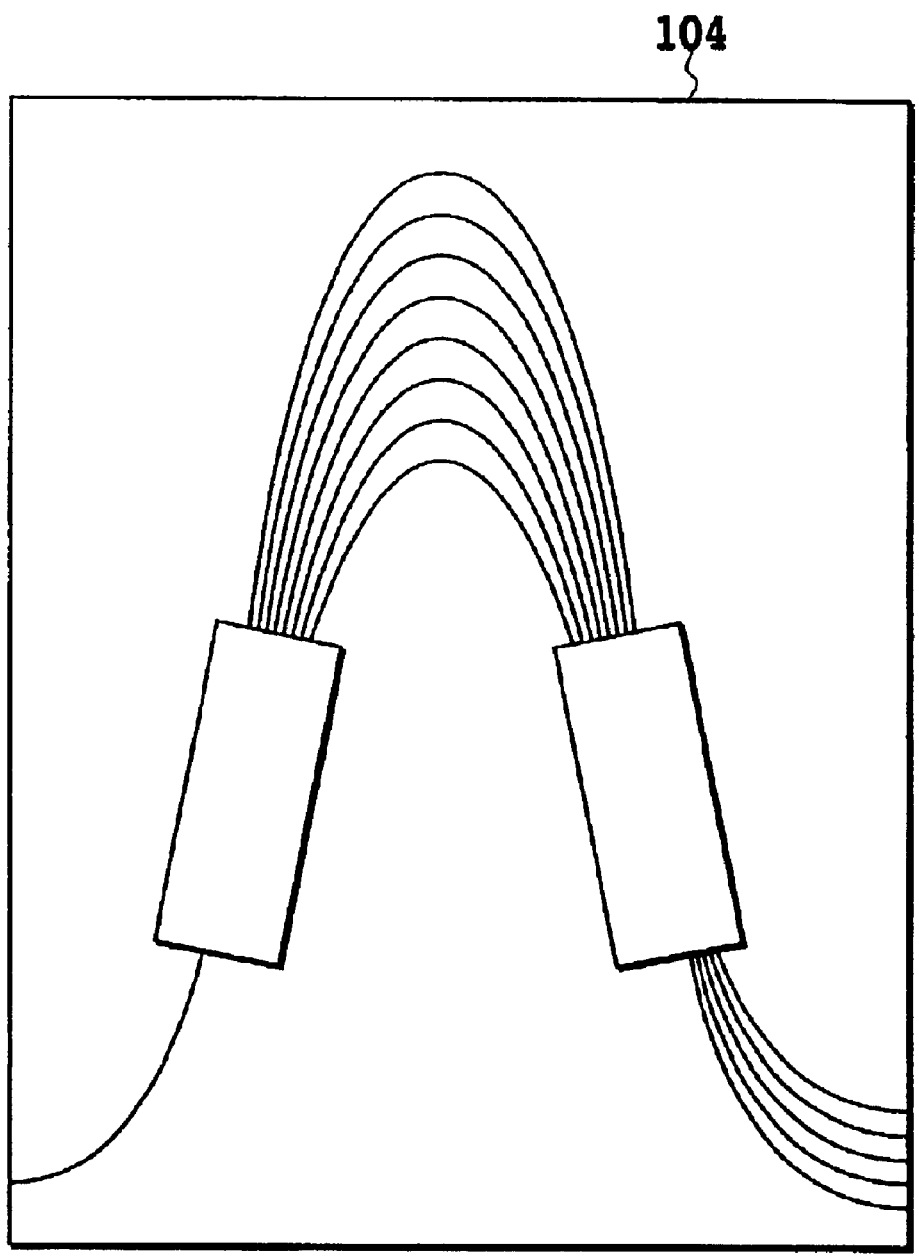
FIG. 9 is a diagram showing a configuration of the optical frequency selecting section of an embodiment in accordance with the present invention.

FIG. 9 shows the optical frequency selecting section of an embodiment in accordance with the present invention. The optical frequency selecting section 104 utilizes an arrayed-waveguide grating. The single frequency component is selectively extracted by matching the repetition frequency of the pulse light source to the wavelength separation spacing (frequency spacing) of the arrayed-waveguide grating or of an interferometer type optical filter because the longitudinal mode spacing of the pulse of the pulse light source agrees with the repetition frequency spacing of the pulse train. When a light source with a repetition frequency of 10 GHz is used as the optical pulse generating section 101, the generated optical pulses include the longitudinal mode component of 10 GHz spacing. Accordingly, the arrayed-waveguide grating has the wavelength separation frequency spacing of 10 GHz. Such an arrayed-waveguide grating can be fabricated with silica-based glass.

The configuration of the optical frequency selecting section 104 is not limited to the foregoing. As long as it is a short bandwidth bandpass filter with a frequency spacing on the order of gigahertz, and can selectively extract only one frequency component from the frequency components of the output pulse, its filter structure such as a Mach-Zehnder interferometer and Michelson interferometer is not limited. In addition, as for the arrayed-waveguide grating as shown in FIG. 9, the configuration and the number of input/output waveguides are not limited to the foregoing. For example, it is enough that is has a function capable of selectively extracting the central frequency from the longitudinal mode components with 10 GHz spacing.

Finally, the stability of the wavelength tunable light source of the present embodiment will be described. The wavelength tunable light source of the present embodiment is a light source capable of carrying out fast and broad bandwidth wavelength tunable operation using an optical nonlinear phenomenon. Since the light source operates in a very stable state using the optical nonlinear phenomenon called a soliton wave, its stability is very high. As to the soliton wave, when an optical pulse transmits through a nonlinear medium, it causes refractive index variations in accordance with its optical intensity, and varies the phase of the light along the time axis, thereby expanding the optical frequency component. The expansion of the frequency component shortens the image of the Fourier transform in the time domain (temporal waveform), thereby bringing about the pulse compression. On the other hand, since the nonlinear medium is also a dispersion medium, it causes a pulse broadening because of the wavelength dispersion. Thus, the soliton wave travels through the nonlinear medium without varying the temporal waveform with maintaining the balance between the pulse compression and expansion. In other words, it is like a unique point at which the dispersion balances with the nonlinear phenomenon. Accordingly, applying the tunable principle to the wavelength tunable light source using the soliton wave enables the highly stable operation by only regulating the optical intensity and dispersion. More specifically, the wavelength tunable operation is achieved by controlling the temperature changes in the optical fiber functioning as the dispersion medium, and by regulating the optical intensity of the pulse.

[Pulse Light Source]

Figure 10:
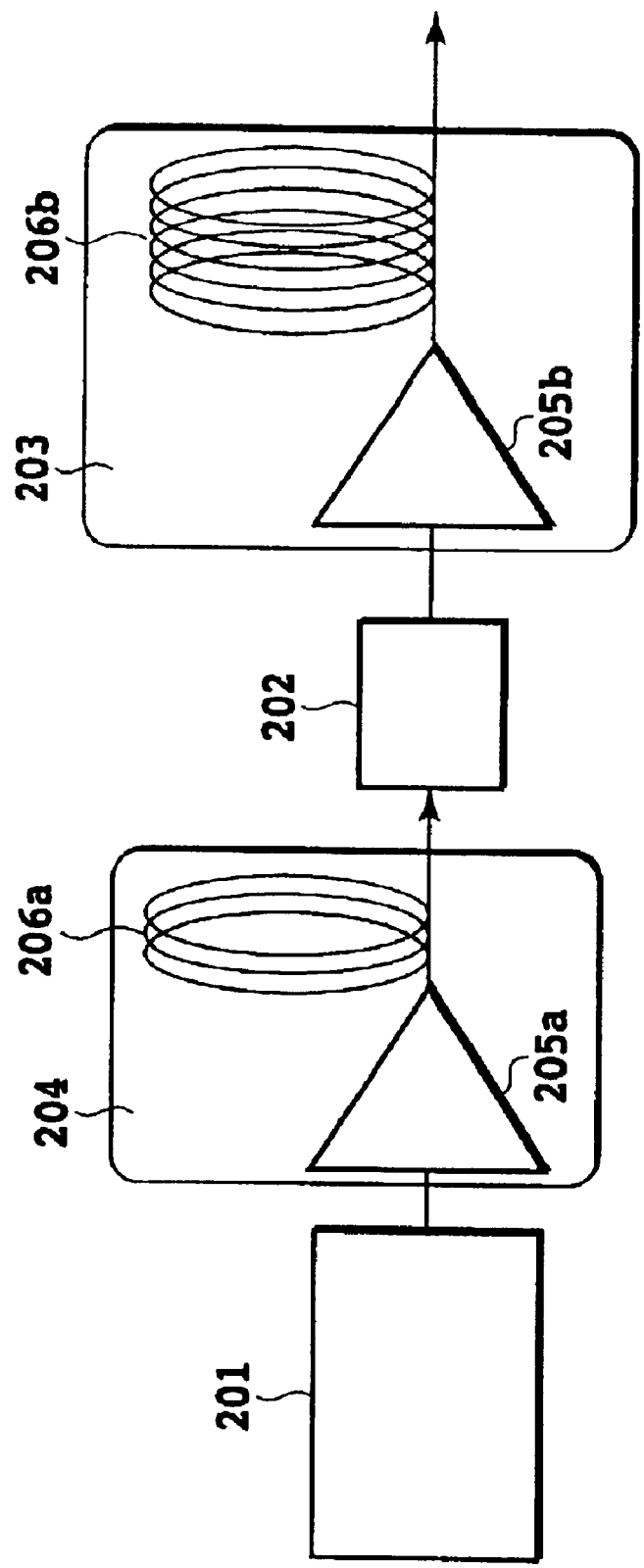
FIG. 10 is a block diagram showing a configuration of the pulse light source of an embodiment in accordance with the present invention.

FIG. 10 shows a configuration of the pulse light source of an embodiment in accordance with the present invention. The pulse light source comprises an optical pulse generating section 201; an optical pulse compressor 204 for compressing the pulse width of the optical pulse the optical pulse generating section 201 generates; an amplitude control section 202 for controlling the amplitude of the optical pulse the optical pulse compressor 204 outputs; and an optical frequency converter 203 for converting the frequency of the optical pulse the amplitude control section 202 outputs. The optical pulse generating section 201 is an LD-pumped pulse light source which generates a short optical pulse.

The optical pulse compressor 204 is not essential for the pulse light source of the present embodiment, and its configuration is not limited to the configuration described below. The optical pulse compressor 204 utilizes the pulse compression method using the optical nonlinear phenomenon based on the higher-order optical soliton using an optical amplifier 205a in connection with an optical fiber 206a. According to this method, the frequency components of the spectrum expand because the refractive index of the nonlinear medium varies in time in response to the optical intensity. Correcting the temporal deviation (chirping) of the frequency components by a dispersion medium enables the pulse compression. In this case, an optical fiber with a suitable wavelength dispersion slope can satisfy the functions of both the optical nonlinear medium and dispersion medium simultaneously.

The optical amplifier 205a of the optical pulse compressor 204 amplifies the optical pulse generated by the optical pulse generating section 201 up to a desired optical intensity level. The optical intensity level can also be adjusted by an optical attenuator. In this case, the optical amplifier 205a can be removed, if the optical intensity of the optical pulse the optical pulse generating section 201 outputs is large enough to bring about the pulse compression in the optical fiber 206a.

Incidentally, to achieve the efficient pulse compression, it is effective to utilize a method of increasing the peak power of the pulse with the compression, or a phenomenon that the zero dispersion wavelength in the nonlinear medium for the pulse compression shifts toward the longer wavelength side with the propagation of the compressed pulse.

The amplitude control section 202 controls the amplitude of the short optical pulse from the optical pulse generating section 201. Its detail will be described later with reference to FIGS. 11 and 14.

As described above, the phenomenon is known in which when a short optical pulse propagates through a nonlinear medium such as an optical fiber, the optical frequency shifts toward the longer wavelength side in accordance with the propagation distance. In this case, the nonlinear medium has a zero dispersion wavelength at a wavelength shorter than the central wavelength of the optical pulse. The optical frequency converter 203 achieves the ultra-fast, wide bandwidth wavelength tunable operation by controlling the optical Kerr effect in such a fiber using an optical amplifier 205b and an optical fiber 206b. Incidentally, the optical amplifier 205b is not an essential component, and can be removed as long as the optical intensity of the input short optical pulse is sufficient.

Arranging the light source in accordance with the present invention using the optical waveguide such as the optical fiber instead of using a spatial optical system can implement the maintenance free, highly operable wavelength tunable light source that does not require trouble for adjusting optical axis or expert knowledge from a user. In addition, using the LD pumping can achieve the system with highly stable, compact and economical characteristics.

Figure 11:
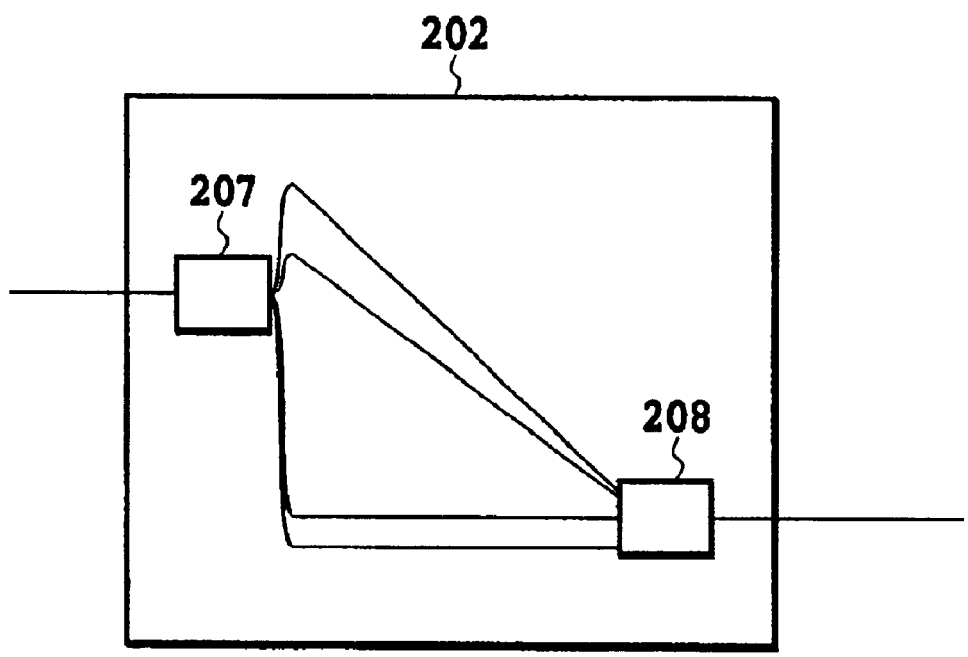
FIG. 11 is a diagram showing a configuration of the amplitude control section of the first embodiment in accordance with the present invention.

FIG. 11 shows the amplitude control section of the first embodiment in accordance with the present invention. The amplitude control section 202 comprises an optical splitter 207 functioning as a demultiplexing means with a fixed demultiplexing ratio of 1×4; a plurality of optical waveguides functioning as a delay means for providing predetermined optical path differences, that is, the time delays dT; and a multiplexer 208 for multiplexing the outputs of the plurality of optical waveguides.

Figure 12A:
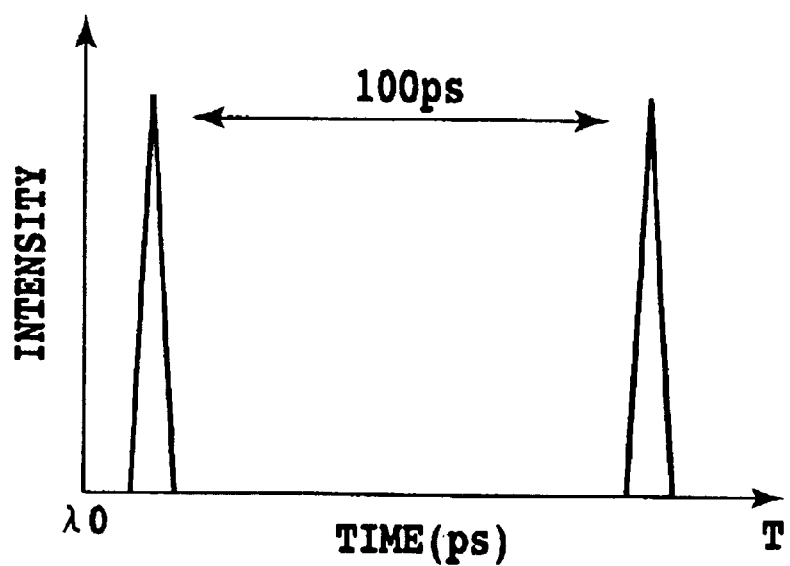
FIG. 12A is a graph illustrating an input waveform to the amplitude control section when equally splitting the optical intensity of an optical pulse through an optical splitter.
Figure 12B:
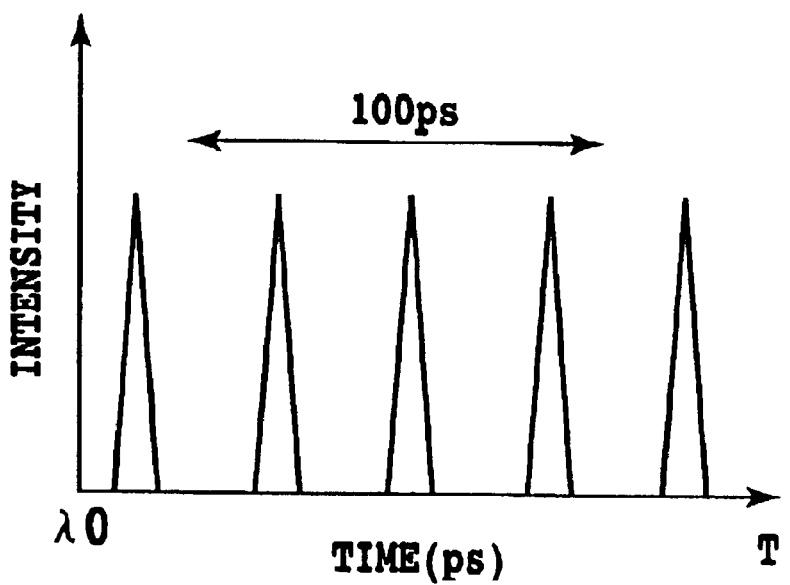
FIG. 12B is a graph illustrating an output waveform of the amplitude control section for the input waveform as illustrated in FIG. 12A.

FIG. 12A illustrates an input waveform to the amplitude control section; and FIG. 12B illustrates an output waveform when the optical splitter 207 equally splits the optical intensity of the optical pulse. The optical pulse generating section 201 generates optical pulses (100 ps spacing) with a wavelength $\lambda 0$ and repetition frequency 10 GHz, and supplies them to the optical splitter 207 of the amplitude control section 202 of FIG. 11. The amplitude control section 202 carries out the time division multiplexing of the optical pulses obtained by equally splitting the optical intensity, and outputs after converting them into optical pulses (25 ps spacing) with a repetition frequency 40 GHz. The optical frequency converter 203 converts the output short optical pulses to the wavelength $\lambda 1$.

Thus, the pulse light source of the present embodiment can generate the short optical pulses with the time spacing less than that of the optical pulses the optical pulse generating section 201 generates.

Figure 13A:
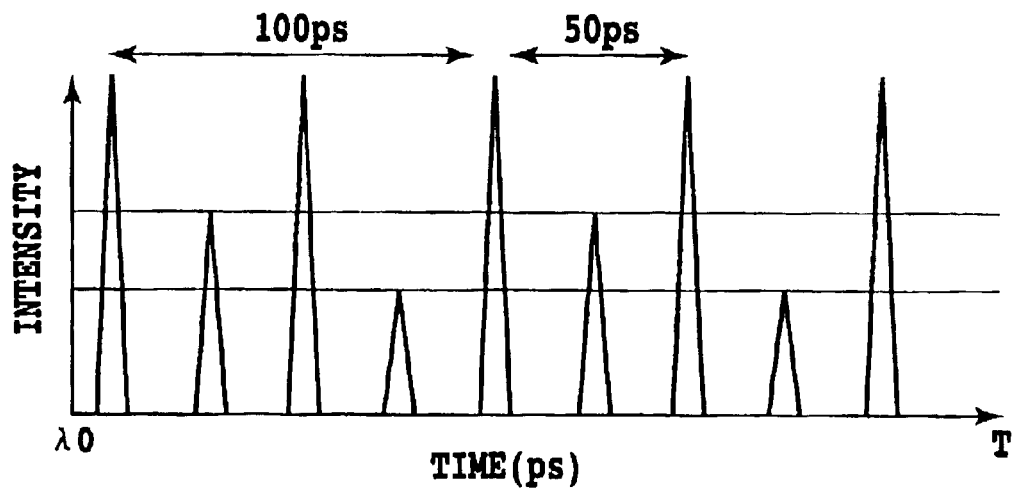
FIG. 13A is a graph illustrating an output waveform of the amplitude control section when the optical intensity of the optical pulse is unequally split by the optical splitter.
Figure 13B:
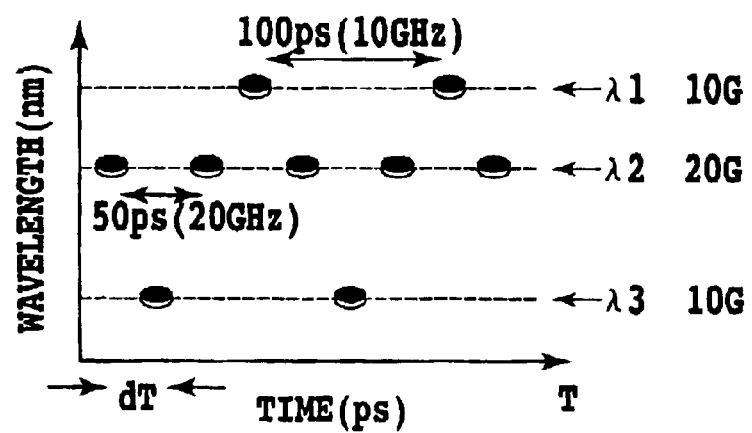
FIG. 13B is a graph illustrating output waveforms of the optical frequency converter when the optical intensity of the optical pulse is unequally split by an optical splitter.

FIG. 13A illustrates an output waveform of the amplitude control section when the optical splitter does not equally split the optical intensity of the optical pulse. The optical pulse generating section 201 generates optical pulses (100 ps spacing) with a wavelength $\lambda 0$ and repetition frequency 10 GHz, and supplies them to the optical splitter 207 of the amplitude control section 202 of FIG. 11. FIG. 13A illustrates an example of the output waveform, in which the demultiplexing ratio of the optical splitter 207 is set such that two ports output the same optical intensity level, and the remaining ports output different optical intensity levels. FIG. 13B illustrates the output waveforms of the optical frequency converter in this case. The optical frequency converter 203 simultaneously produces a pulse train with a wavelength $\lambda 1$ and repetition frequency 10 GHz, a pulse train with a wavelength $\lambda 2$ and repetition frequency 20 GHz, and a pulse train with a wavelength $\lambda 3$ and repetition frequency 10 GHz.

In this way, the pulse light source of the present embodiment can output a given number of pulse trains with various wavelengths and given repetition frequencies by setting the demultiplexing ratio at an appropriate value.

Figure 14:
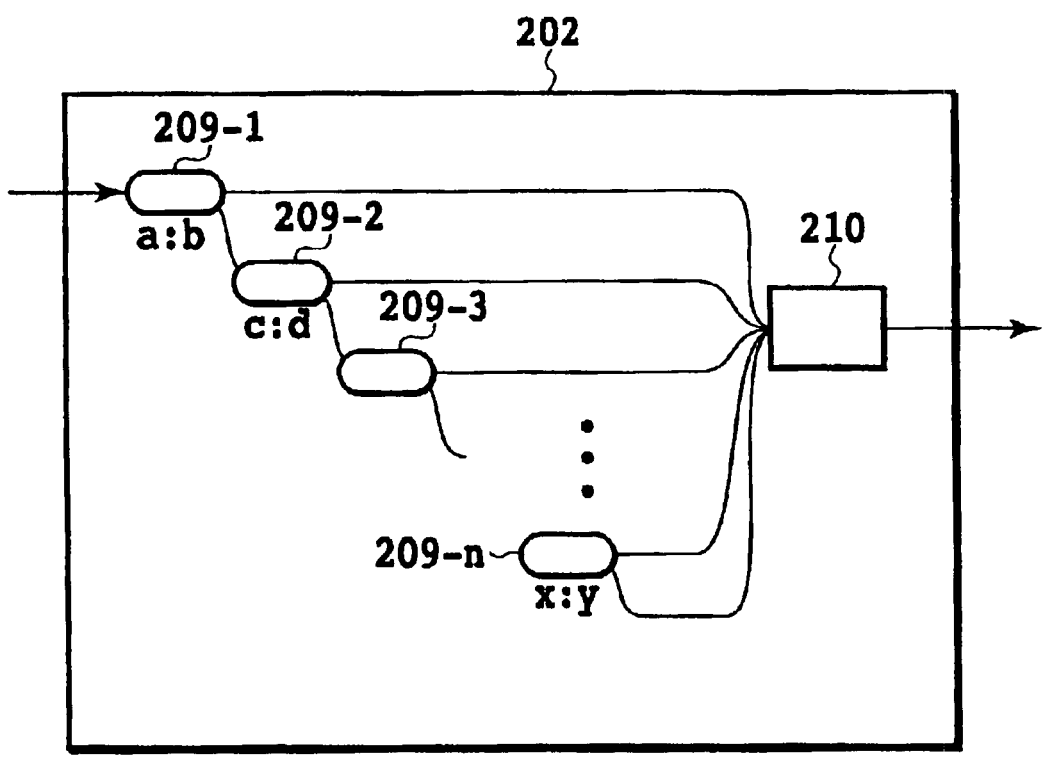
FIG. 14 is a diagram showing a configuration of the amplitude control section of the first embodiment in accordance with the present invention.

FIG. 14 shows a configuration of the amplitude control section of a second embodiment in accordance with the present invention. The amplitude control section 202 comprises optical switches 209-1–209-$n$ functioning as the demultiplexing means capable of varying the demultiplexing ratios; a plurality of optical waveguides functioning as a delay means for providing fixed optical path differences, that is, time delays dT; and a multiplexer 210 for multiplexing the outputs of the plurality of optical waveguides. The optical switches 209–1 to 209-$n$ each consist of a Mach-Zehnder interferometer that is formed on a glass substrate, and varies its coupling ratio according to the thermooptic effect. The optical switches 209–1 to 209-$n$ can vary the coupling ratio by varying the refractive index of the glass by heating.

With such an arrangement, the pulse light source of the present embodiment can output a given number of pulse trains with various wavelengths and given repetition frequencies just as the amplitude control section of the first embodiment by setting the coupling ratios at appropriate values.

The present invention has been described in detail with respect to preferred embodiments, and it will now be apparent from the foregoing to those skilled in the art that changes and modifications may be made without departing from the invention in its broader aspect, and it is the intention, therefore, in the apparent claims to cover all such changes and modifications as fall within the true spirit of the invention.

What is claimed is:

1. A wavelength tunable light source capable of varying a wavelength of generated light, said wavelength tunable light source comprising:

optical pulse generating means for generating an optical pulse;

amplitude control means for superimposing control light on the optical pulse generated by said optical pulse generating means to control the amplitude of said optical pulse and outputting a short optical pulse; and optical frequency converting means for converting a frequency of the short optical pulse by launching the short optical pulse output from said amplitude control means into an optical nonlinear medium whose refractive index varies in response to electric-field intensity of the incident light.

2. The wavelength tunable light source as claimed in claim 1, wherein said optical pulse generating means comprises pulse compression means for compressing a pulse width of the optical pulse.

3. The wavelength tunable light source as claimed in claim 1, wherein said amplitude control means comprises:
control light generating means for generating the control light;
control light modulating means for modulating at least one of the amplitude and phase of the control light generated by said control light generating means; and
multiplexing means for outputting the short optical pulse by multiplexing the control light modulated by said modulating means with the optical pulse.

4. The wavelength tunable light source as claimed in claim 1, wherein said amplitude control means comprises:
demultiplexing means for demultiplexing the optical pulse into first and second optical pulses;
control light modulating means for modulating one of amplitude and phase of the first optical pulse; and
multiplexing means for multiplexing the second optical pulse with the first optical pulse modulated by said control light modulating means to output the short optical pulse.

5. The wavelength tunable light source as claimed in claim 1, wherein said nonlinear medium has a zero dispersion wavelength at a wavelength shorter than a central wavelength of the optical pulse.

6. The wavelength tunable light source as claimed in claim 1, further comprising optical frequency selecting means for launching into an optical filter the short optical pulse passing through frequency conversion by said optical frequency converting means, and for extracting a single frequency component of the short optical pulse to output continuous light.

7. The wavelength tunable light source as claimed in claim 6, wherein said optical filter consists of an interferometer-type optical filter.

8. The wavelength tunable light source as claimed in claim 6, wherein said optical filter consists of an arrayed-waveguide grating.

9. The wavelength tunable light source as claimed in claim 2, wherein said amplitude control means comprises:
control light generating means for generating the control light;
control light modulating means for modulating at least one of the amplitude and phase of the control light generated by said control light generating means; and
multiplexing means for outputting the short optical pulse by multiplexing the control light modulated by said modulating means with the optical pulse.

10. The wavelength tunable light source as claimed in claim 2, wherein said amplitude control means comprises:
demultiplexing means for demultiplexing the optical pulse into first and second optical pulses;
control light modulating means for modulating one of amplitude and phase of the first optical pulse; and
multiplexing means for multiplexing the second optical pulse with the first optical pulse modulated by said control light modulating means to output the short optical pulse.

11. The wavelength tunable light source as claimed in claim 2, wherein said nonlinear medium has a zero dispersion wavelength at a wavelength shorter than a central wavelength of the optical pulse.

12. The wavelength tunable light source as claimed in claim 2, further comprising optical frequency selecting means for launching into an optical filter the short optical pulse passing through frequency conversion by said optical frequency converting means, and for extracting a single frequency component of the short optical pulse to output continuous light.

13. The wavelength tunable light source as claimed in claim 12, wherein said optical filter consists of an interferometer-type optical filter.

14. The wavelength tunable light source as claimed in claim 12, wherein said optical filter consists of an arrayed-waveguide grating.

15. A pulse light source comprising:
optical pulse generating means for generating optical pulses;
amplitude control means for time division multiplexing the optical pulses generated by said optical pulse generating means to output short optical pulses; and
optical frequency converting means for converting a frequency of the short optical pulses by launching the short optical pulses output from said amplitude control means into an optical nonlinear medium whose refractive index varies in response to electric-field intensity of the incident light.

16. The pulse light source as claimed in claim 15, wherein said amplitude control means comprises:
demultiplexing means for demultiplexing each of the optical pulses into a plurality of optical pulses;
delay means for providing a different time delay to each of the optical pulses demultiplexed by said demultiplexing means; and
multiplexing means for multiplexing the optical pulses output from said delay means.

17. The pulse light source as claimed in claim 16, wherein said demultiplexing means carries out equal demultiplexing that provides the individual demultiplexed optical pulses with a same optical intensity level.

18. The pulse light source as claimed in claim 16, wherein said demultiplexing means carries out unequal demultiplexing that provides at least two of the demultiplexed optical pulses with different optical intensity levels.

19. The pulse light source as claimed in claim 16, wherein said demultiplexing means consists of at least one optical splitter with a fixed demultiplexing ratio.

20. The pulse light source as claimed in claim 16, wherein said demultiplexing means consists of at least one optical switch with a variable demultiplexing ratio.

21. The pulse light source as claimed in claim 15, further comprising pulse compression means for compressing a pulse width of the optical pulse generated by said optical pulse generating means, and for supplying the compressed optical pulse to said amplitude control means.

* * * * *